United States Patent [19]

Saia, III et al.

[11] Patent Number: 5,125,237

[45] Date of Patent: * Jun. 30, 1992

[54] PORTABLE SELF-CONTAINED COOLER/FREEZER APPARATUS FOR USE ON AIRPLANES, COMMON CARRIER TYPE UNREFRIGERATED TRUCK LINES, AND THE LIKE

[75] Inventors: Louis P. Saia, III, P.O. Box A, Station 1, Houma, La. 70360; Cynthia Wilbrandt, Chicago, Ill.

[73] Assignee: Louis P. Saia, III, Houma, La.

[*] Notice: The portion of the term of this patent subsequent to May 2, 2006 has been disclaimed.

[21] Appl. No.: 602,856

[22] Filed: Oct. 23, 1990

Related U.S. Application Data

[63] Continuation-in-part of Ser. No. 493,298, Mar. 14, 1990, Pat. No. 4,991,402, which is a continuation of Ser. No. 343,025, Apr. 24, 1989, abandoned, which is a continuation of Ser. No. 119,702, Nov. 12, 1987, Pat. No. 4,825,666.

[51] Int. Cl.$^5$ .............................................. B60H 1/32
[52] U.S. Cl. ........................................ 62/239; 62/52.1; 62/457.9; 62/384
[58] Field of Search ................ 62/384, 239, 457.9, 62/52.1

[56] References Cited

U.S. PATENT DOCUMENTS

| | | | |
|---|---|---|---|
| 2,608,832 | 9/1952 | Woods | 62/384 |
| 3,225,822 | 12/1965 | Westling | 62/240 |
| 3,287,925 | 11/1966 | Kane et al. | 62/52.1 |
| 3,561,226 | 2/1971 | Rubin | 62/388 |
| 3,633,381 | 1/1972 | Haaf et al. | 62/222 |
| 3,695,056 | 10/1972 | Glynn et al. | 62/384 |
| 3,864,936 | 2/1975 | Frank et al. | 62/384 |
| 3,889,486 | 6/1975 | Hinkley et al. | 62/239 |
| 3,959,982 | 6/1976 | Denis et al. | 62/223 |
| 3,961,925 | 6/1976 | Rhoad | 62/376 |
| 3,977,208 | 8/1976 | Heighton | 62/237 |
| 4,276,752 | 7/1981 | Modler et al. | 62/166 |
| 4,399,658 | 8/1983 | Nielsen | 62/52 |
| 4,407,144 | 10/1983 | Garside | 62/239 |
| 4,459,825 | 7/1984 | Crouch | 62/404 |
| 4,502,293 | 3/1985 | Franklin, Jr. | 62/388 |
| 4,532,774 | 8/1985 | Burns | 62/239 |
| 4,576,017 | 3/1986 | Combs et al. | 62/372 |
| 4,580,411 | 4/1986 | Orfitelli | 62/371 |
| 4,606,195 | 8/1986 | Winkler | 62/384 |
| 4,621,500 | 11/1986 | Pabani et al. | 62/239 |
| 4,704,876 | 11/1987 | Hill | 62/388 |
| 4,716,739 | 1/1988 | Harris et al. | 62/78 |
| 4,878,360 | 11/1989 | Viegas | 62/239 |
| 4,882,912 | 11/1989 | Fossey | 62/239 |

OTHER PUBLICATIONS

1975 Sea-Land Service, Inc. Brochure.
Navieras Equipment Specifications and Capacities Sheet.

Primary Examiner—Ronald C. Capossela
Attorney, Agent, or Firm—Pravel, Gambrell, Hewitt, Kimball & Krieger

[57] ABSTRACT

A transportable container for carrying refrigerated products in frozen (sub zero) or refrigerated (for example, 40°) temperatures inlcudes a structural container having an insulated outer shell with an access doorway. The upper portion of the container includes a transverse perforated baffle and positioned above the baffle are a pair of spaced apart canisters containing liquid refrigerant ($CO_2$, for example). A gas or liquid feeder tube penetrates each bottle and communicates with an on/off valve. A feeder tube can draw liquid to dispense for cooling, or it can release gas and pressure within the canister to boil the $CO_2$. When $CO_2$ reaches its boiling point, the canister, its bracket, and the cold plate reach very cold tempertures to cool the cargo area. The gas is released through copper tubing over the cold plate to act as a method for convection. A temperature regulator valve dispenses $CO_2$ from the canisters through a header in order to maintain a desired temperature over a wide span of temperatures including, for example sub zero temperatures ($-20°$ F., for example) up to room temperature.

30 Claims, 9 Drawing Sheets

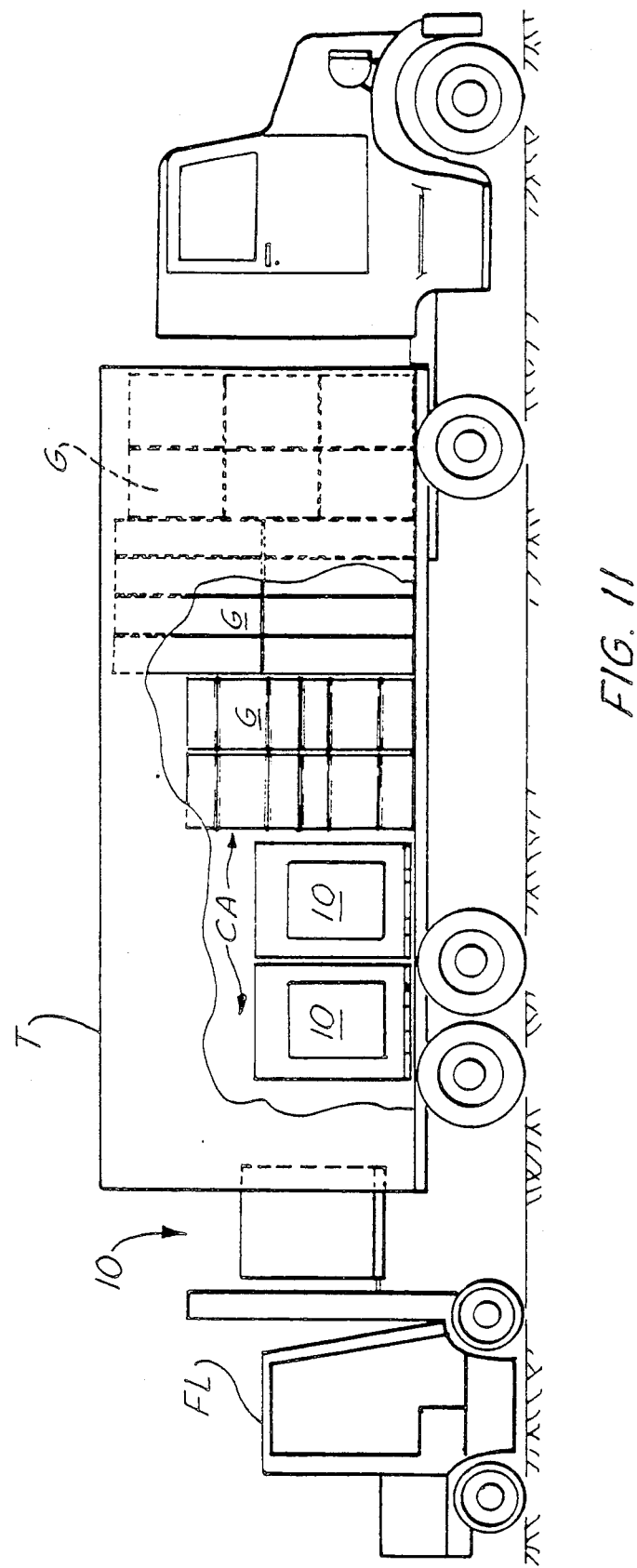

PORTABLE SELF-CONTAINED COOLER/FREEZER APPARATUS FOR USE ON AIRPLANES, COMMON CARRIER TYPE UNREFRIGERATED TRUCK LINES, AND THE LIKE

This is a continuation-in-part of U.S. patent application Ser. No. 07/493,298, filed Mar. 14, 1990, now U.S. Pat. No. 4,991,402 which is a continuation of Ser. No. 343,025, filed Apr. 24, 1989 (now abandoned) which is a continuation of Ser. No. 119,702, filed Nov. 12, 1987, now U.S. Pat. No. 4,825,666, all incorporated herein by reference.

BACKGROUND OF THE INVENTION

1. Field of the Invention

The present invention relates to refrigerated contain having self-contained refrigeration systems. Even more particularly, the present invention relates to an improved portable self-contained cooler/freezer apparatus wherein either an external bulk supply or self-contained carbon dioxide canister dispense $CO_2$ or like liquid coolant through a manifold and plate like diffuse system to regulate temperature within the container, and wherein a temperature controlled solenoid valve dispenses $CO_2$ or like coolant as needed into the shipping container walls to cool.

2. General Background

Many truck lines use refrigerated trucks to carry food products over long distances. Typically, such a truck is designed to carry either frozen foods or foods that must be maintained in higher, but still refrigerated temperatures, such as, for example, 40° F. These trucks typically carry either refrigerated or frozen food only and differ from the typical common carrier truck which is unrefrigerated and which carries any of a number of bulk, unrefrigerated commodities, such as palletized loads of any general merchandise, product, or equipment. Presently, there does not exist a means for carrying refrigerated and/or frozen food products over long distances of several hundred or even thousands of miles via common carrier, namely, with trucks that are not refrigerated but which have space for holding any number of general commodities.

Several devices have been patented which have attempted to provide portable refrigeration devices. An example is U.S. Pat. No. 3,633,381, entitled "Open-Cycle Portable Refrigerator." In that patent there is disclosed a portable refrigerator employing an open cycle system. A stored compressed gas, such as carbon dioxide is passed from the storage container through an evaporator which comprises a serpentine passageway for the gas in a surrounding medium, such as water, an aqueous solution, which is maintained frozen due to the passage of the expanding compressed gas through the coiled passageway. The temperature of the evaporated medium is lower than the ambient temperature of the interior or the container comprising the storage portion of the refrigerator which is cooled thereby. The gas passing through the evaporator may be exhausted into the interior of the container whereby the cooler air which is, next to the evaporator medium is circulated throughout the interior of the container.

A portable ice chest having a refrigeration unit is disclosed in U.S. Pat. No. 3,959,982. A substantially closed refrigeration receptacle in fluid communication with the outlet side of the primary evaporator receives the refrigerant which may not have completely evaporated, and separates the phases by venting the evaporated gas phase to the atmosphere while directing the unevaporated liquid refrigerant into a second evaporated coil wherein it is completely evaporated. The thermostatically controlled valve regulates the flow of refrigerant to the primary evaporator as a function of temperature within the chest.

Several systems have been patented which use liquid carbon dioxide as part of a refrigeration system. Notice for example, U.S. Pat. No. 4,399,658, entitled "Refrigeration System With Carbon Dioxide Injector," issued to Nielsen; U.S. Pat. No. 4,459,825, entitled "Apparatus For Controlled Reduction In Temperature and Preservation Of Embryos In A Cryogenic State," issued to Crouch; and U.S. Pat. No. 4,580,411, entitled "Liquid Nitrogen Freezer," issued to James Orfitelli.

Several patents have been issued which relate to shipping containers that have, in some cases, self-contained refrigeration systems. Examples of these shipping containers include U.S. Pat. No. 3,961,925, issued to Rhoad; U.S. Pat. No. 4,502,293, issued to Franklin; U.S. Pat. No. 4,576,017, issued to Combs et al.; and U.S. Pat. No. 4,606,195, issued to Winkler.

The Rhoad U.S. Pat. No. 3,961,925 provides a portable self-contained refrigerated storage and transportation container for preserving perishable commodities and includes an insulated storage chamber for perishable commodities. A recirculating liquid cooling system is provided within the container and includes conduit and nozzle means disposed within the storage chamber adapted to spray a liquid coolant, such as chilled brine directly onto the perishable commodities to maintain them in a uniform cooled temperature. The sprayed liquid coolant is collected in the bottom portion of the storage chamber. A closed refrigeration system is also provided within the container and includes in part heat exchange means disposed within the bottom portion of the storage chamber for cooling the sprayed liquid coolant which has collected there.

The Franklin U.S. Pat. No. 4,502,293, entitled "Container $CO_2$ Cooling System," provides a generally rectangular container that includes an insulated top, bottom, opposite sides and opposite end walls. An upstanding transverse insulated hollow housing is mounted within the container adjacent one end thereof and a $CO_2$ snow cabinet constructed of good heat transfer material is disposed within the housing with opposing wall portions of the cabinet and housing passing exteriorly about the cabinet. A heat insulative horizontal baffle is mounted within the container spaced below the top wall and extends between the sidewalls thereof. The baffle defines a cooled air passage beneath the top wall extending lengthwise of the container. The airflow passage includes an outlet end adjacent and in at least reasonably closed communication with the end of the cooled air passage adjacent the aforementioned one container end wall and an inlet end opening outwardly of the housing into the interior of the container below the baffle. The end of the cooled air passage adjacent the other container end wall opens into the interior of the container and thermostatically controllable air pump structure is provided to effect airflow inwardly of the inlet of the airflow passage, through the airflow passage and into the cooled air passage. Further, structure is provided for spray discharging of liquid $CO_2$ into the interior of the upper portion of the cabinet and into the airflow passage at points spaced therealong in order to form $CO_2$ snow therein.

The Combs U.S. Pat. No. 4,576,017, discloses a container for maintaining its contents at a desired temperature for an extended period of time, such as for use in shipping contents in a frozen condition. The container includes an outer shell which is substantially air tight and which has an inner surface, a pass of heat exchange medium, a support structure for the heat exchange medium, and means for maintaining an air space between the contents of the container and substantially the entire inner surface of the outer shell of the container and between the contents of the container and the support structure for the heat exchange medium for allowing convection current to develop in the inner space which circulates past the heat exchange medium and maintains a substantially uniform temperature around the contents of the container.

In the Winkler U.S. Pat. No. 4,606,195, entitled "Hypobarric Container," there is provided a storage device having a walled inner and outer container and a compressed gas supply contained within the device. A conduit is provided from the gas supply to the inner container and a control valve for the conduit responsive to pressures above and below a super atmospheric pressure value are provided for closing and opening the valve.

SUMMARY OF THE PRESENT INVENTION

The present invention solves the problems and shortcomings of the prior art in a simple straightforward manner by providing an improved portable transportable refrigeration system for use on common carrier type truck lines, for example. The apparatus comprises a self-supporting container having an interior for carrying refrigerated or frozen cargo and adapted to be lifted by a forklift, for example. A canister for containing a liquid refrigerant under pressure is positioned in the upper end portion of the container interior. A pivotally movable perforated baffle plate extends transversely across the container interior at the upper end portion thereof and is positioned directly under the canister. The baffle plate can optionally contain the canisters and manifold with a "floor" to hold frost, ice, and coolness against the canisters and manifold when the device is preliminarily charged with coolant from an external "bulk" source. A temperature control communicates with the canister for controlling temperature within the interior and includes a manifold header for discharging liquid refrigerant from the canister. The manifold header includes a preferably externally extending inlet opening receptive of a source of bulk $CO_2$ for quick charging the unit interior with $CO_2$ so that the canisters need only maintain coolness. Further, the manifold can be used to charge the canisters when empty with liquid $CO_2$ from any bulk external supply source of liquid $CO_2$ or like refrigerant. A pressure control valve controls the pressure of fluid discharged from the canister, and a temperature valve is positioned in the header downstream of the pressure control valve which thus controls temperature within the interior and over a wide temperature span of, for example, $-20°$ F. to $70°$ F. Henceforth very accurate temperatures can be maintained. Canisters have bent tubes that can be positioned to vent either gas or liquid. For liquid, the tubes point down and for gas the tubes point up.

In the preferred embodiment, the container includes a base plate having two spaced apart parallel slots adapted to be engaged by a forklift lifting device. The apparatus in the preferred embodiment includes an array of perforations extending over a substantial portion of the hinged baffle plate.

In the preferred embodiment, the canister, the pressure control valve, and the temperature control valve, as well as the header, are positioned above the baffle plate.

In the preferred embodiment, the manifold header is in the elongated tube having an external inlet that allows the manifold to be connected to an external $CO_2$ "bulk" supply for either charging the canisters when empty, or for quick cooling the container interior before a shipment.

In the preferred embodiment, the container includes a vertical access doorway that extends substantially the full height of the container, terminating below the hinged baffle plate in its hinged position.

In the preferred embodiment, the apparatus includes a valve which communicates with internal vent tubes that can optionally remove either gas or liquid from the canister.

In the preferred embodiment, the valve includes bent tubes or ducts extending internally and to the side inner wall of the canister from the valve structure, and positioned to dispense either liquid or gas respectively when the canisters are in their usual horizontal position.

In the preferred embodiment, there are a pair of canisters and the manifold header is positioned above the baffle plate and generally between the canisters.

Use of the hinged transverse plate with perforations allows the canister, the pressure control valve, the temperature control valve and the header to be "quick frozen" by an external source of liquid refrigerant via the manifold header before the entire apparatus is shipped. The perforations thus define with the sides of the overall container a smaller interior space that closely surrounds the canister, and the header, so that when liquid refrigerant from an external source is added to the smaller interior area above the baffle, the smaller interior area of the baffle, the smaller interior space is filled with solid $CO_2$ and snow and at very low temperatures without affecting the components of the refrigeration system used to ship at temperatures above $0°$ F. "Blasting" the container with the hinged perforated baffle plate down is used when quick chilling is desired to commence loading the container for product which requires accurate temperatures in the range of $-10°$ F. to $70°$ F. This feature and process very much extends the period of time during which materials can be kept refrigerated.

"Quick chilling" prior to use and prior to shipping prevents the canisters from losing supply by bringing a "hot" box to a lower desired temperature, so that the canisters may not, for example, begin the operation of dispensing cooling $CO_2$ for several hours after the goods are shipped.

BRIEF DESCRIPTION OF THE DRAWINGS

A better understanding of the invention can be had when the detailed description of a preferred embodiment set below is considered in conjunction with the drawings, in which:

FIG. 11 is a schematic, elevational view illustrating the shipping method of the present invention.

DETAILED DESCRIPTION OF THE PREFERRED EMBODIMENT

Figure 1:
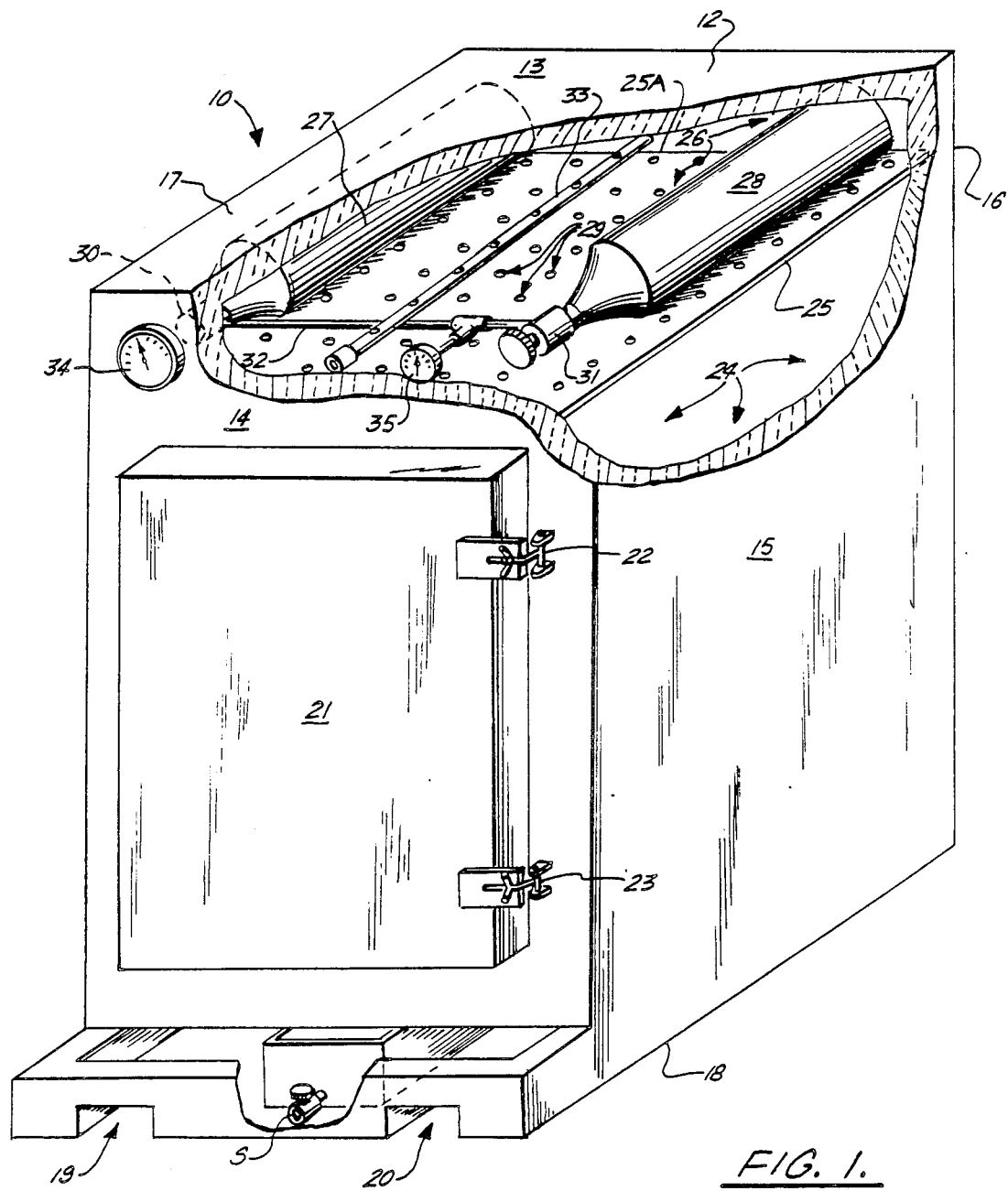
FIG. 1 is a perspective partially cutaway view of the preferred embodiment of the apparatus of the present invention.
Figure 2:
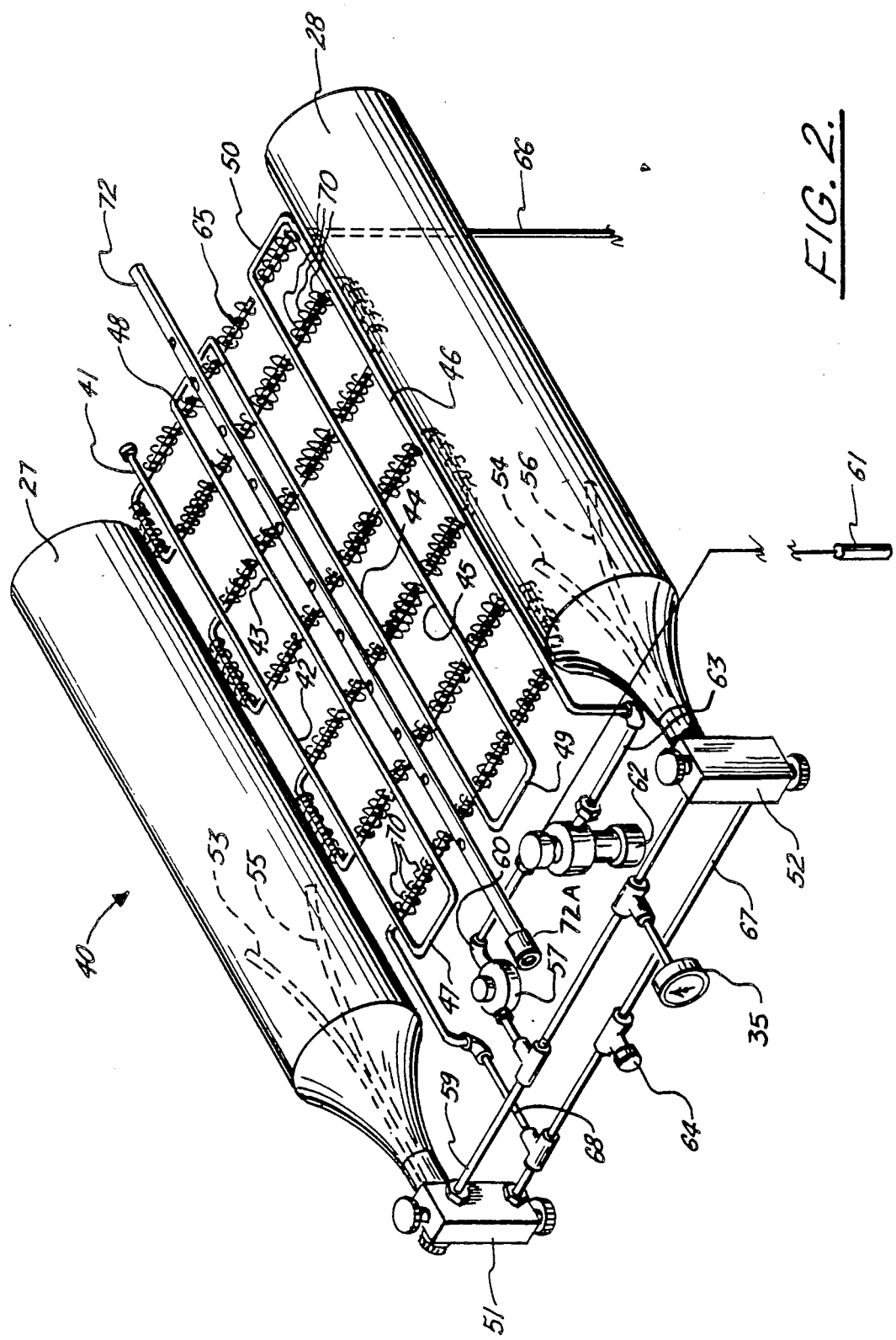
FIG. 2 is a partial perspective view of the preferred embodiment of the apparatus of the present invention illustrating an optional header system.
Figure 3:
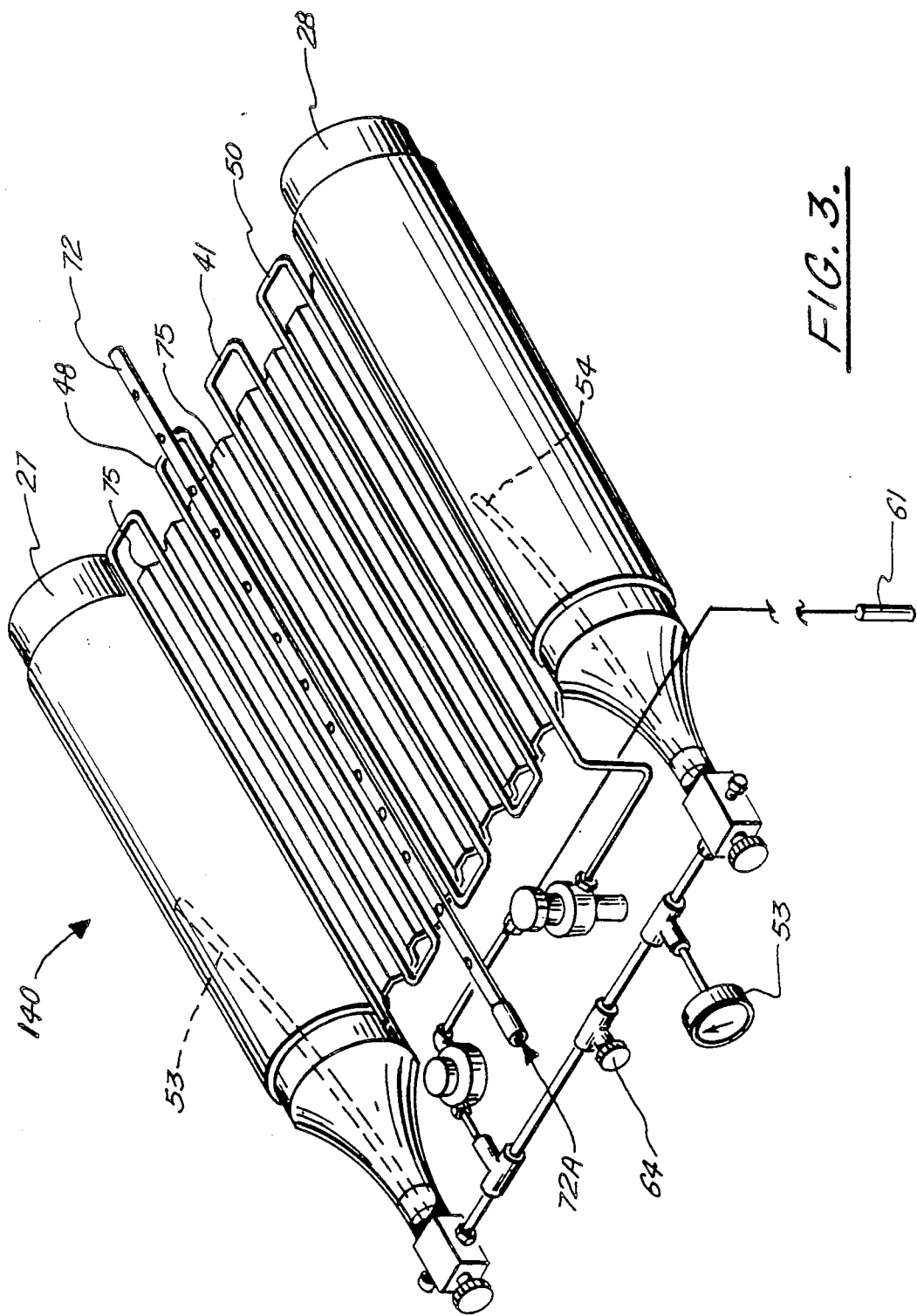
FIG. 3 is a second embodiment of the apparatus of the present invention.

FIGS. 1-3 show generally the preferred embodiment of the apparatus of the present invention designated generally by the numeral 10.

In FIG. 1, there can be seen an enlarged rectangular transportable box-like container 12 having an upper surface 13 and a plurality of side walls 14, 15, 16, 17 forming an enclosure with a bottom 18 portion of the container. The bottom 18 includes a pair of spaced apart recesses 19, 20, for example, which can be used to form a connection with the times of a fork lift so that the container 10 can be easily moved and transported about, such as during unloading or loading of trucks or airplanes. Thus, the present invention provides a method of transporting refrigerated products within the interior of an unrefrigerated dry-type truck (see FIG. 11) comprising the steps of first housing the products in an insulated container 10 with an interior for holding products that is substantially smaller in volume than the truck T cargo interior volume. The container interior is cooled with a liquid cryogenic refrigerant that is dispensed from a canister that is contained within the container interior. The flow of liquid refrigerant is discharged from the canister using a liquid control valve and the temperature within the container interior is controlled by an opening and closing of the valve. Thus, the truck T can contain the containers 10 within the cargo area CA along with non-refrigerated non-perishable goods designated generally by the letter G in FIG. 11. In FIG. 11, a fork lift-type lifting mechanism FL is shown lifting a container 10 into the truck T cargo area CA. The apparatus 10 can include an access doorway 21 that would preferably be vertically oriented and pivotally attached, having closure latches 22, 23 thus allowing access through door 21 into the interior 24 of container 12. Container 12 would be manufactured, for example, of welded stainless or welded aluminum construction. The bottom section of container 12 defines a reservoir to hold any water that accumulates during use. A valved drain 5 can be used to remove water during or after use from the reservoir.

A hinged transverse perforated baffle 25 extends across the upper portion of container 12 defining an uppermost interior compartment 26 that contains canisters 27, 28. Baffle plate 25 is hingedly connected to container rear wall 16 along edge 25A so that the baffle plate 25 can swing down into a generally vertical position adjacent rear wall 16 (when the apparatus is to be used for shipping product in a cooled but not frozen condition). The baffle plate 25 swings into a horizontal position as shown in FIG. 1, creating the confined compartment area 26 about canisters 27, 28, when the apparatus is to be used for shipping product in a frozen condition. Plate 25 is held in the upper horizontal position using a latch (not shown) or removable thumb screws or such like means.

Canisters 27, 28 are preferably canisters containing liquid refrigerant, preferably carbon dioxide or a like refrigerant, such as nitrogen, and the canisters are positioned upon their sides in a horizontal position, as shown in FIGS. 1, 2 and 3. The plate 25 preferably includes a plurality of perforations therethrough designated as 29 in FIG. 1. The canisters 27, 28 are each equipped with exit valves 30, 31 which communicate with header 32 that connects with manifold header 33 positioned generally between canisters 27, 28 and generally parallel thereto, as shown in FIG. 1. Manifold 33 has an externally extended end portion 33A (FIG. 6) that is an inlet fitting which allows a "bulk" external source of liquid refrigerant such as $CO_2$ to be transmitted to the manifold header 33 for two purposes as selectively desired. Firstly, the manifold header can "quick cool" the interior 24 with $CO_2$ from the bulk source before a shipment. Normally, if frozen foods are being shipped, the baffle plate is put in the upper position (FIG. 1) and $CO_2$ is blasted into the confined compartment 26 covering the canisters 27, 28 and header with ice and generally filling the area 26 with ice and snow. Secondly, the manifold can be used to fill the tanks 27, 28 when they are empty.

A valve interfacing manifold 33 and header 32 controls flow from manifold fitting 33A to either tanks 27, 28 (for filling) or to header 33. The container 12 would preferably be equipped with an externally mounted temperature gauge 34 so that a user can view the internal temperature 24 by viewing the thermometer 34, even when the door 21 is closed.

Pressure gauge 35 could also extend externally of container 12 so that the pressure within header 32 could be viewed externally of the apparatus 10. In the embodiment of FIG. 1, the valves 30 and/or 31 would be opened allowing carbon dioxide to flow through header 32 and into perforated tube 33 so that $CO_2$ would enter the internal portion 26 of box 12 above perforated plate 25 causing cold air to refrigerate that portion of the box 12 interior 24.

The use of transverse plate 25 allows the interior 26 of box 12 above plate 25 to be preliminarily frozen using, for example, a blast of $CO_2$ from an external source, a source other than canisters 27, 28 before the box is to be shipped. This allows a frozen condition above plate 25 which supplements the amount of cooling that would otherwise be required to keep the entire container 12 at a particular refrigerated temperature. Thus, before shipment, the common carrier would simply blast the container for a specified period of time and quickly lower the temperature of the container to reduce the work load on the canisters. This allows the boxes to be shipped over much longer distances than ordinarily would be possible if only cooling from canisters 27, 28 were used.

The embodiment of FIG. 2 is alternate construction for the arrangement of canisters 27, 28 and the header and valves. In the embodiment of FIG. 2, designated generally by the numeral 40, there can be seen a pair of canisters 27, 28 having positioned therebetween an elongated header 41 which is a gas exhaust header and includes tube sections 42-46 which are generally parallel and a plurality of elbow tubes 47-50 connecting the tube sections, as shown in the drawings end to end, to form an elongated header for gas exhaust.

A pair of dual on/off exhaust valves, (See FIGS. 4 and 5) 51, 52 each provide a gas feeder tube 53, 54 and a liquid feeder tube 55, 56 respectively. A transverse flow line 59 connects valves 51, 52 while a lowermost transverse flowline 67 also connects the lower end portion of valves 51, 52. Pressure regulator 57 regulates the pressure of gas leaving canisters 27, 28 through transverse header 59. Discharge flowline 60 communicates with pressure regulator 57 and with dual temperature regulator valve 62.

A temperature probe 61 senses temperature within the container 24 below baffle 25 so that the temperature probe dictates when gaseous $CO_2$ is discharged through valve 62 through discharge line 63 which communicates with gas exhaust header 41. Transverse flowline 67 receives liquid $CO_2$ from valves 51, 52 as the lines 55, 56 typically collect liquid $CO_2$ from canisters 27, 28. Liquid $CO_2$ thus enters liquid carrying heat exchanger coil 65 through flowline 68. The liquid carrying heat exchange coil 65 can be provided, as shown in the drawing, with a plurality of transverse fins 70 for efficiency purposes in heat transfer between the air within container 12 interior and the liquid-carrying coil 65. Line 66 would be connected back to dual temperature regulator valve 62 so that as the liquid could become gaseous at valve 62, it also could be discharged through outlet 63 into gas exhaust header 41. Header 72 is preferably an elongated cylindrical tube having a plurality of openings spaced along the length thereof, with an inlet 72A extending externally of the container 12 so that a bulk $CO_2$ source can be used to preliminarily charge and cool container 12. The header 72 could be piped (and appropriately valved) to canisters 27, 28 so that the canisters 27, 28 could be charged when empty from a bulk $CO_2$ source via header inlet 72A. It should be understood that the elongated header tube 72 is in communication with gas exhaust header 41 so that the gas contained within header 41 eventually can be discharged through openings in header tube 72. Valve 64 is provided to regulate flow between canisters 27 and 28.

FIG. 3 shows another embodiment 140 of the invention wherein a transverse pan 75 is used immediately under the gas exhaust header tubes. The pan 75 can wrap around the canisters 27, 28 as shown to form a tray that holds ice and snow.

Figure 4:
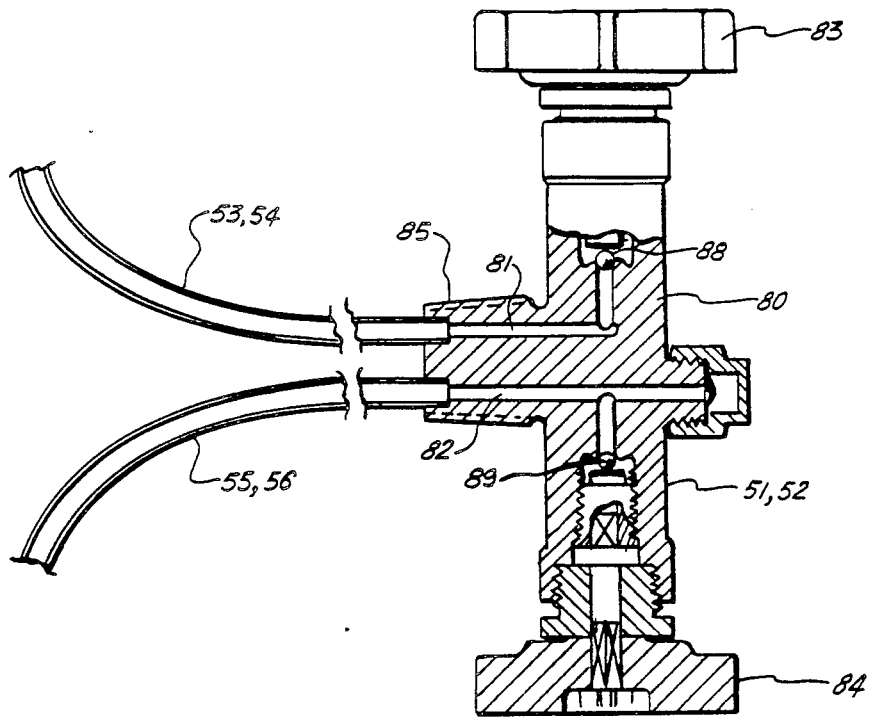
FIG. 4 is a fragmentary view of the preferred embodiment of the apparatus of the present invention illustrating the preferred valved construction for the dual valve portion thereof.
Figure 5:
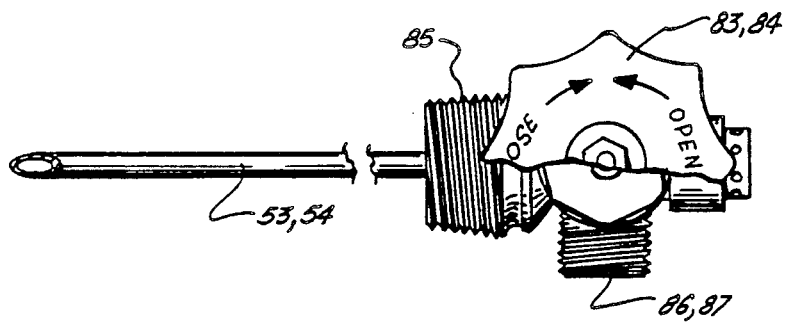
FIG. 5 is a side fragmentary view illustrating the dual on/off valve portion of the apparatus of the present invention.

FIGS. 4 and 5 show more particularly the construction of dual on/off valves 51, 52 each comprising a valve body 80 that communicates with a pair of internal passageways 81, 82. The passageway 81 communicates with tubes 53, 54 while the passageway 82 communicates with tubes 55, 56. Transverse passageways 88, 89 communicate respectively with externally extending transverse ports 86, 87 which preferably form connections with transverse headers 59, 67. Thus, header 59 connects to the uppermost port 86 of valves 51, 52 while the lowermost port 87 connects with header 67. An opening of each valve by rotating the spigots 83, 84 open the ports 88, 89 so that flow can proceed respectively via tubes 53, 54 and passageway 81 (with respect to the opening 88 and spigot 83) or via tubes 55, 56 through passageway 82 and opening 89. Thus using the dual valve of FIGS. 4 and 5, either gas or liquid or both, could be removed from canisters 27, 28.

Figure 6:
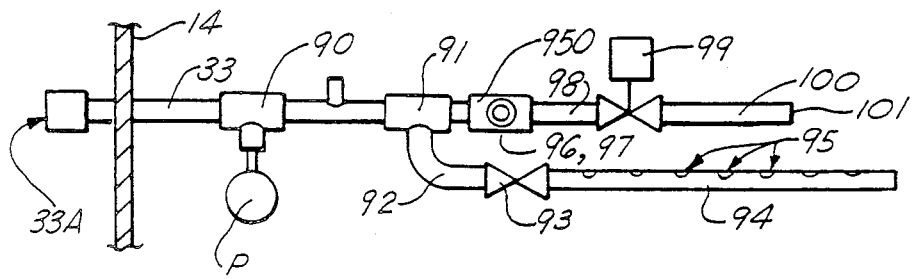
FIG. 6 shows a sectional elevational view of the preferred embodiment of the apparatus of the present invention illustrating a piping arrangement used for charging the container and/or filling the canisters.

In FIG. 6 there can be seen a piping detail which specifies a piping arrangement that can be used to either charge the canisters 27, 28 when they are empty, or blast liquid or gas $CO_2$ directly into the container interior. The inlet header 33 is equipped with an external fitting 33A that extends beyond the container wall 14. The header 33 connects with a T 90 which carries a pressure indicator P. A second downstream T 91 communicates with an elbow 92 that is equipped with a valve 93. The valve 93 controls the flow of fluid from T 91 through elbow 92 and downstream to header 94 which is equipped with a series of perforations or ports 95. When valve 93 is open, and a source of bulk $CO_2$ attached at fitting 33, a large volume of liquid $CO_2$ or $CO_2$ gas can be immediately charged into the container interior via the header 94 and more particularly through the series of ports 95.

When valve 93 is closed, the header 33 can be used to either fill canisters 27, 28 through cross 950 which contains a pair of lateral lines 96, 97 which would communicate through appropriate piping with valves 30, 32 so that when valve 93 is closed, bulk $CO_2$ added through fitting 33A can fill canisters 27, 28. Downstream of cross 950 is a pipe section 98 which communicates with temperature responsive control valve 99 that communicates with downstream affluent header 100 and more particularly with the orifice fitting 101 portion thereof. This would be a relatively small orifice opening 101. During use, the valve 93 would first be opened to charge the container 12 with a blast of $CO_2$ to lower the temperature. After this initial blast from a bulk $CO_2$ source, the valve 93 would be closed. Thereafter, the temperature responsive valve 99 would only open when needed to supply $CO_2$ from canisters 27, 28 into the container interior by discharging the $CO_2$ into the cross fitting 950 so that it could flow through the valve 99 to the orifice 101. Thus, with the present invention a bulk $CO_2$ source could be initially used to greatly lower the temperature of the cargo and thereafter the canisters would only be needed to maintain that temperature. Thus, the bulk source could be used to supply much of the cooling that was needed to lower the temperature, with the canisters 27, 28 only being needed on a maintenance basis after the shipment was sent.

Figure 7:
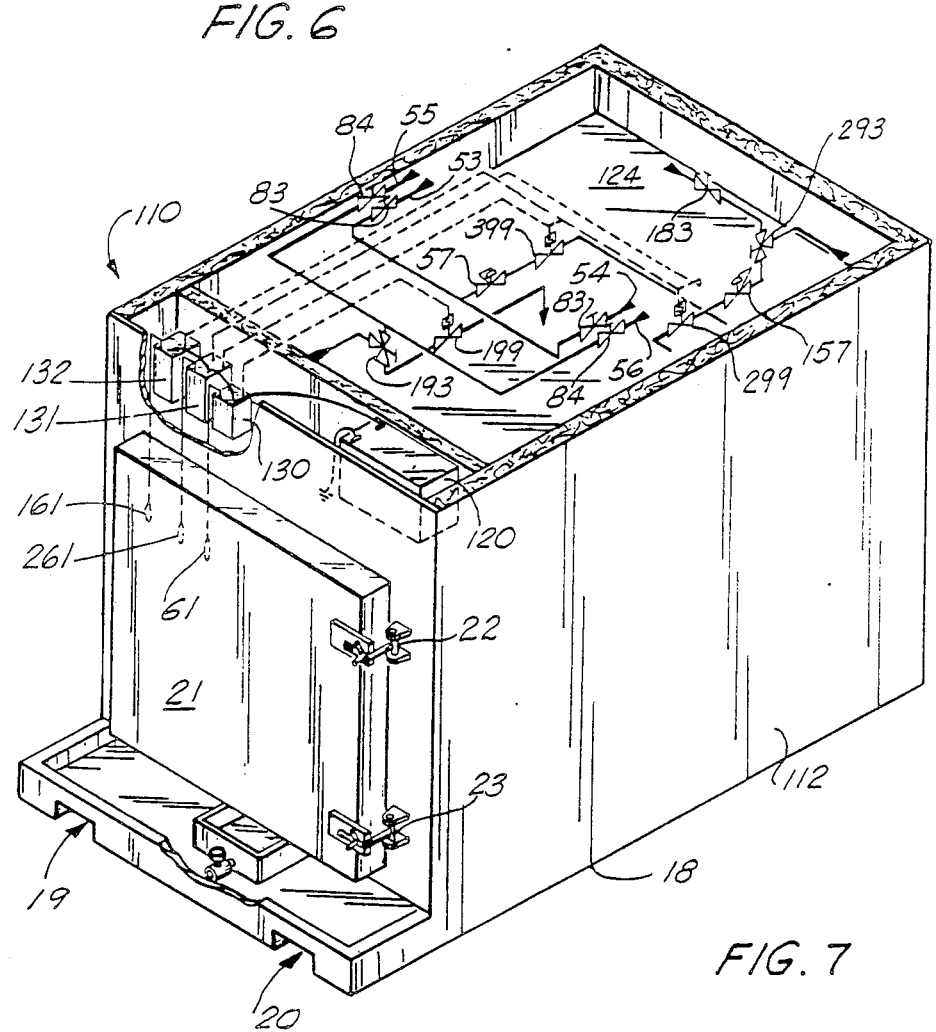
FIG. 7 is a perspective view of an embodiment of the apparatus of the present invention having means for controlling the atmosphere within a container.

FIG. 7 is a perspective view of another embodiment of the present invention, apparatus 110. Apparatus 110 comprises a container 112, and has means therein for controlling the atmosphere of interior 124 of container 112. Although not shown in FIG. 7, apparatus 110 preferably includes canisters 27 and 28, which may contain nitrogen or carbon dioxide. Apparatus 110 preferably also includes a canister (not shown) which contains oxygen. The atmosphere of the interior 124 of container 112 is controlled by a number of valves, including valves 83, 84, 183, 193, 199, 293, 299, and 399. Valves 83 control the flow of nitrogen gas or carbon dioxide gas from canisters 27 and 28. Valves 84 control the flow of liquid carbon dioxide or liquid nitrogen from canisters 27 and 28. Valves 83 and 84 are hand regulating valves.

Valve 183 controls the flow of gaseous oxygen from a container (not shown) containing oxygen. Three-way valve 193 allows bulk fill of canisters 27 and 28 with carbon dioxide or nitrogen. Solenoid-actuated valve 199 controls the injection of liquid nitrogen or carbon dioxide. Solenoid-actuated valve 399 controls the injection of gaseous nitrogen or carbon dioxide. Three-way valve 293 is provided to allow bulk fill of the oxygen container (not shown). Pressure regulator 157 controls the pressure in the oxygen line.

Solenoid-actuated valve 299 is provided to allow oxygen injection. Sensor 161 is connected to analyzer 132, which has a maximum limit set point controller. Sensor 161 may be either a nitrogen or carbon dioxide sensor, depending upon whether nitrogen or carbon dioxide is contained in canisters 27 and 28. Likewise, analyzer 132 may analyze either nitrogen or carbon dioxide.

Sensor 261 senses oxygen content within interior 124 of container 112. Sensor 261 is connected to oxygen analyzer 131. Analyzer 131 controls the amount of 02 between minimum and maximum limit set points.

Temperature sensor 61 is connected to temperature controller 130. Temperature controller 130 includes a set point. When the temperature inside interior 124 rises above the set point, controller 130 causes solenoid-actuated valve 199 to open to allow injection of nitrogen or carbon dioxide into interior 124 to cool the contents of container 112.

Figure 8:
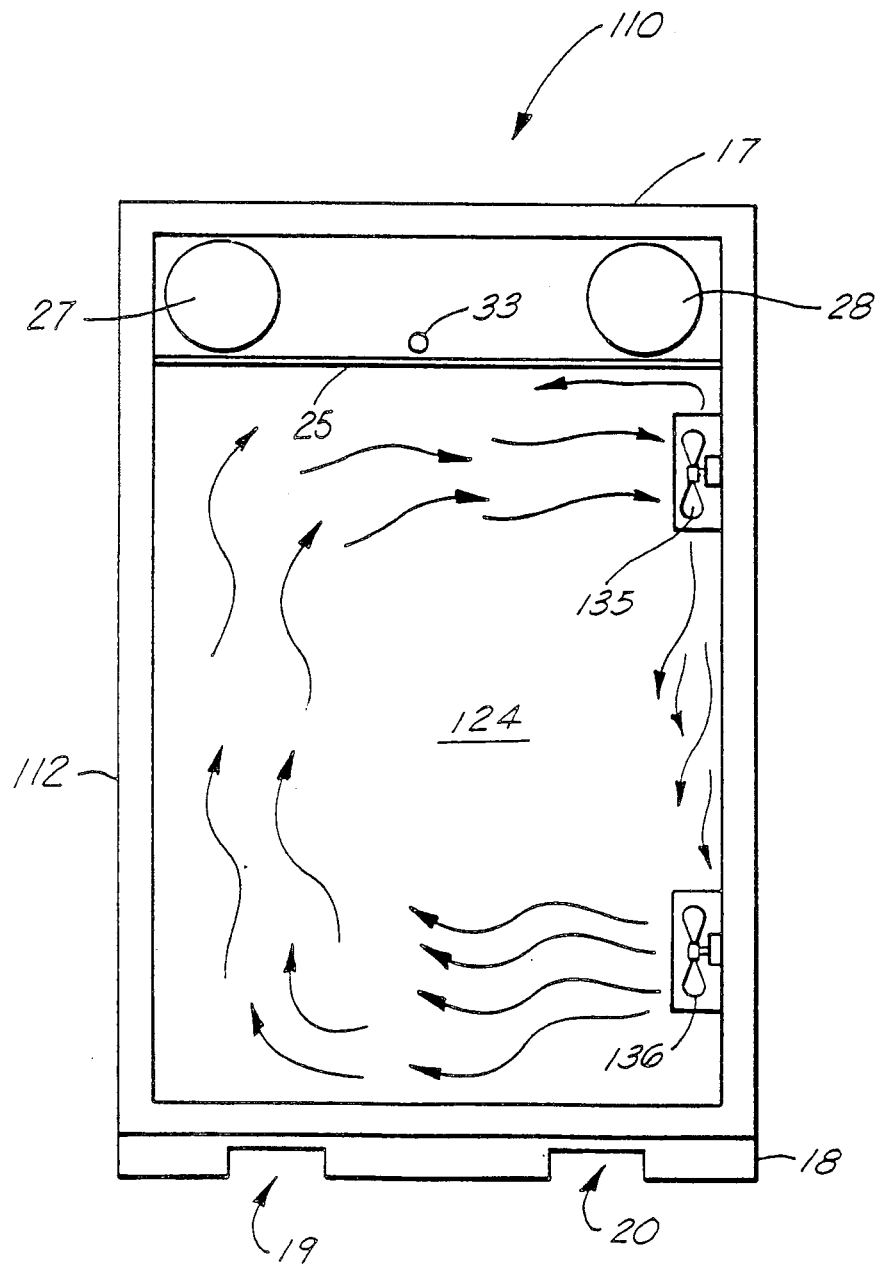
FIG. 8 is a sectional end view of the apparatus shown in FIG. 7.

A rechargeable battery 120 provides electricity needed to run analyzers 131 and 132, temperature controller 130, and fans 135 and 136 (see FIG. 8). Fans 135 and 136 helps circulate the gases within interior 124 so that the temperature within container 112 is approximately uniform throughout.

Apparatus 110 is useful when transporting materials which require a controlled amount of oxygen (such as live plants or animals).

Oxygen analyzer 131 and sensor 261 detect the amount of oxygen in container 112. When the oxygen level drops below the minimum limit set point, analyzer 131 communicates with solenoid-actuated valve 299 to allow more oxygen to enter the interior 124 of container 112, until the amount of oxygen reaches the maximum limit set point, at which point valve 299 closes. Should the amount of oxygen rise above the maximum limit set point, then analyzer 131 causes solenoid-actuated valve 399 to open, allowing the emission of nitrogen or carbon dioxide gas into interior 124 until the oxygen level is reduced below the maximum limit set point.

Figure 9:
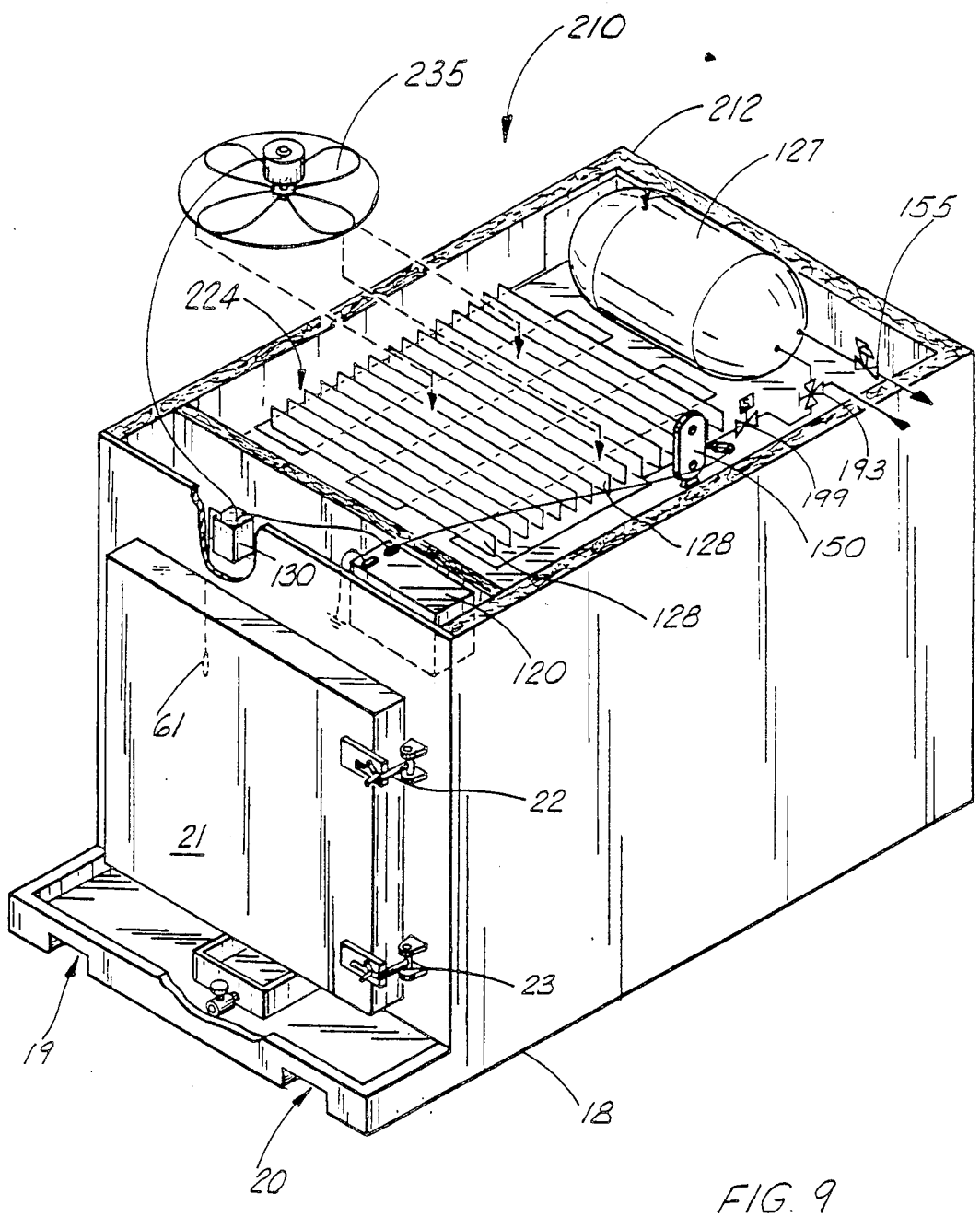
FIG. 9 is a perspective view of an embodiment of the present invention utilizing a closed-loop system for cooling a container.

FIG. 9 is a perspective view of another embodiment of the present invention, apparatus 210. Apparatus 210 includes a closed-loop cooling system. The cooling system comprises a $CO_2$ slush vessel 127, cooling fins 128, valves 155, 193, and 199, a positive displacement diaphragm pump 150, and a fan 235 for forced air convection. When temperature controller 130 detects that the temperature of interior 224 of container 212 has risen above the pre-set temperature, it causes positive displacement diaphragm pump 150 to pump $CO_2$ from vessel 127 through fins 128 and it causes fan 235 to turn on. As the $CO_2$ moves through fins 128, it lowers the temperature of the fins, and fans 235 blows the cold gas downward in the interior 224 of container 212. The $CO_2$ returns from fins 128 to $CO_2$ slush vessel 127. Pressure relief valve 155 is provided to allow pressure to be released from $CO_2$ slush vessel 127.

The use of apparatus 210 with its closed-loop cooling system is advantageous when one does not wish to have the cooling gas (carbon dioxide or nitrogen, for example) mixed with the contents in the container 212.

Figure 10:
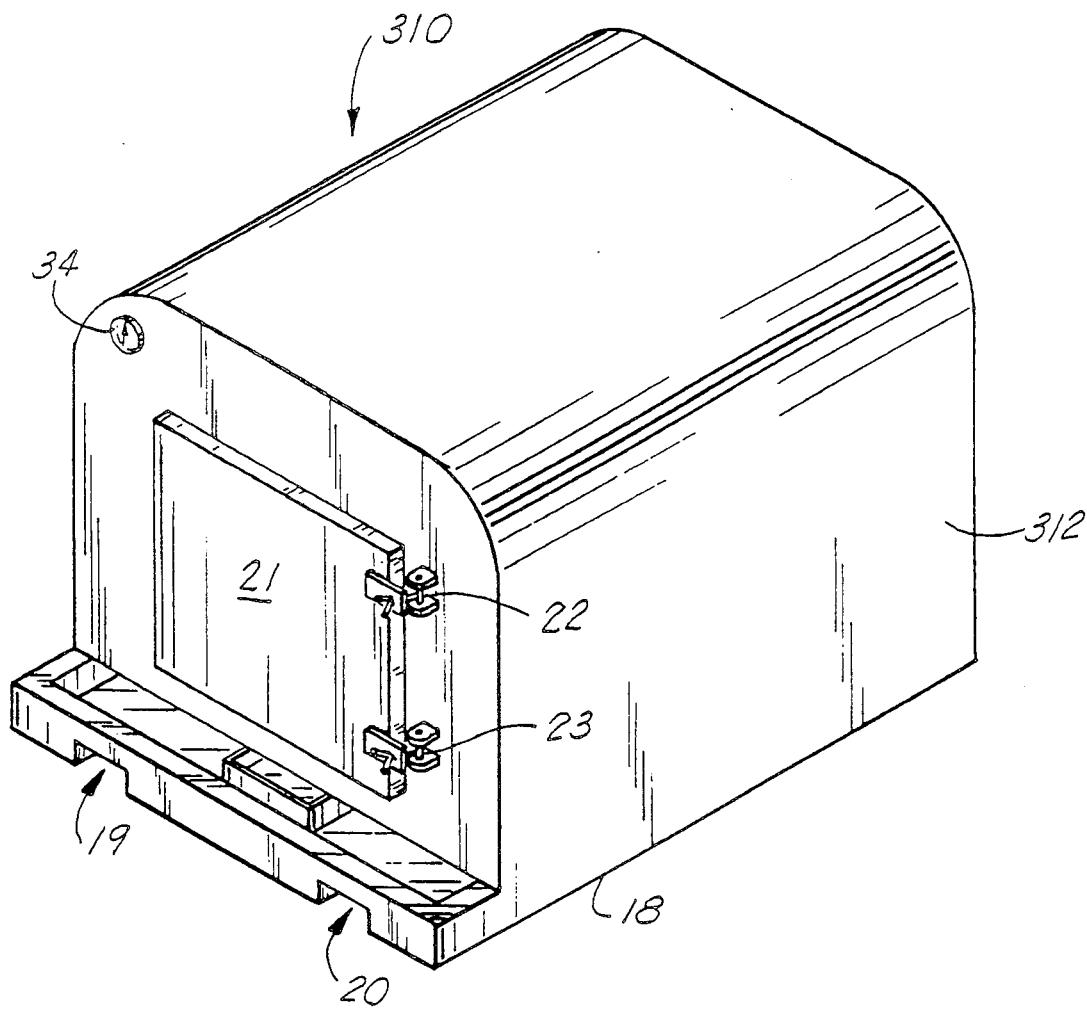
FIG. 10 is a perspective view of an embodiment of the present invention which can be used to transport air cargo.

Although container 212 is shown without a top, it could include a flat top 17 as in containers 12 and 112, or it could contain a curved top like the one in container 312 (see FIG. 10).

FIG. 10 shows another embodiment of the present invention, apparatus 310. Apparatus 310 includes a container 313 which has a top shaped to easily fit within an aircraft. Container 312 may include any of the cooling systems and controlled atmosphere system discussed in conjunction with the previous embodiments.

Container 312 preferably does not exceed 125 inches in any dimension, and more preferably does not exceed 80 inches in height, 90 inches in width, and 125 inches in length.

In view of the numerous modifications which could be made to the preferred embodiments disclosed herein without departing from the scope or spirit of the present invention, the details herein are to be interpreted as illustrative and not in a limiting sense.

What is claimed as invention is:

1. A shipping container for shipping frozen and/or refrigerated cargo in an unrefrigerated cargo area of an aircraft comprising:
   a) a container having an interior area with a volume to be loaded with the frozen and/or refrigerated cargo with an access opening that can be opened/closed;
   b) lower most lifting means positioned at the bottom of the container for quickly transferring the container into and out of the unrefrigerated cargo area of the larger transport vehicle;
   c) one or more refrigerant tanks mounted in the container for containing a cryogenic liquified refrigerant under pressure to be utilized for cooling the container interior;
   d) discharge piping means for piping liquified refrigerant from the tanks;
   e) valve means communicating with the discharge piping for valving the flow of liquified refrigerant that is discharged from the tank;
   f) temperature responsive controller means for opening the valve means to dispense liquified refrigerant from the tanks order to maintain a desired preselected preset refrigerated or frozen temperature range within the container interior;
   g) wherein the liquified refrigerant converts to a gaseous phase downstream of the valve means; and
   h) an undercarriage portion at the lower end of the container that includes moving means for transporting the container quickly to and from the cargo area of an unrefrigerated vehicle having a substantially larger volume than the container volume.

2. The apparatus of claim 1 further comprising means for controlling the gaseous oxygen concentration within the container.

3. The apparatus of claim 2 including in part a cylinder containing gaseous oxygen under pressure.

4. The apparatus of claim 1 wherein the refrigerant is carbon dioxide and further comprising means for controlling the carbon dioxide concentration within the container.

5. The apparatus of claim 4 further including a carbon dioxide level analyzer and a carbon dioxide controller for maintaining carbon dioxide level below a preset maximum level.

6. The apparatus of claim 1 further comprising atmosphere control means, communicating with the container interior for selectively controlling the gaseous atmosphere within the interior.

7. The apparatus of claim 6, further including at least an oxygen level sensor located within the interior of the container and for monitoring oxygen levels within the interior.

8. The apparatus of claim 7 wherein the oxygen level is controlled between pre set, high and low oxygen set points.

9. The apparatus of claim 8 further comprising a pressure regulator for controlling the pressure of gaseous oxygen discharged into the container interior.

10. The apparatus of claim 9 further comprising a control valve for valving gaseous oxygen flow to the container interior.

11. The apparatus of claim 6 including at least a carbon dioxide level sensor located within the interior of the container and for monitoring carbon dioxide levels within the interior.

12. The apparatus of claim 6 further comprising nitrogen level control means for controlling an injection of nitrogen into the container interior to lower carbon dioxide concentration when the level of carbon dioxide exceeds a preset maximum level.

13. The apparatus of claim 6 further comprising absorbent means for removing excess quantities of carbon dioxide from the container interior.

14. The apparatus of claim 13 further comprising absorbent means for removing gaseous ethylene from the container interior.

15. The apparatus of claim 6 further comprising exhaust valve means for venting the container interior.

16. The apparatus of claim 6 further comprising dispensing means positioned at the bottom end portion of the container for dispensing selected gases for atmosphere control at the bottom of the container.

17. The apparatus of claim 6 further comprising recirculation fan means for agitating air within the container interior.

18. The apparatus of claim 1 further comprising means for controlling humidity within the container interior.

19. The apparatus of claim 18 including a humidity controller for regulating the level of moisture in the atmosphere within the container interior.

20. The apparatus of claim 1 further comprising a closed loop piping temperature control system for controlling container interior temperature without substantial loss of the refrigerant.

21. The apparatus of claim 1 wherein liquid refrigerant expands to a gaseous form downstream of the valve means and is dispensed into the container interior.

22. A transportable refrigeration system for use on unrefrigerated trucks and the like, comprising:
  a) a self-supporting container having an interior for carrying refrigerated or frozen cargo and adapted to be lifted;
  b) lower most lifting means positioned at the bottom of the container for quickly transferring the container into and out of an unrefrigerated truck;
  c) a canister for containing cryogenic liquid refrigerant under pressure;
  d) manifold means for transmitting refrigerant from the canister to the container interior;
  e) a control valve for controlling the flow of liquid refrigerant discharged from the canister to the manifold means;
  f) temperature control means positioned at least partially within the container for controlling temperature within the container interior by activating the control valve to release liquid refrigerant from the canister via the manifold means.

23. The apparatus of claim 22, wherein the canister and manifold are positioned in the top portion of the container interior.

24. The apparatus of claim 22, wherein the canister, pressure control valve, temperature control means, manifold are positioned in the top portion of the container interior.

25. A method of shipping refrigerated perishable goods in an unrefrigerated interior area of a common carrier type truck having an internal cargo holding area capable of holding unrefrigerated articles comprising the steps of:
  a) placing the perishable goods into a first smaller container that can be placed into the unrefrigerated interior cargo area of the truck and leaving space in the cargo area for other unrefrigerated goods to be shipped;
  b) cooling the perishable goods by dispensing a liquid refrigerant from a self contained refrigeration system that includes one or more liquid refrigerant containing canisters that are transported within the first smaller container;
  c) using a valve as part of the self contained refrigeration system to dispense liquid refrigerant coolant from the canisters;
  d) controlling temperature within the container interior area by a control of the degree of opening of the valve.

26. The method of claim 29 further comprising the step of controlling the gaseous atmosphere within the container interior.

27. The method of claim 26 wherein oxygen content within the container interior is controlled.

28. The method of claim 26 wherein carbon dioxide content within the container is controlled.

29. The method of claim 26 wherein the humidity of the container atmosphere is controlled.

30. The method of claim 29 wherein in step "C", refrigerant is dispensed directly into the container interior.

* * * * *